Nov. 28, 1961 V. B. SCOTT ET AL 3,010,317
AUTOMATIC CUSTODY TRANSFER METER
Filed Oct. 22, 1958 5 Sheets-Sheet 1
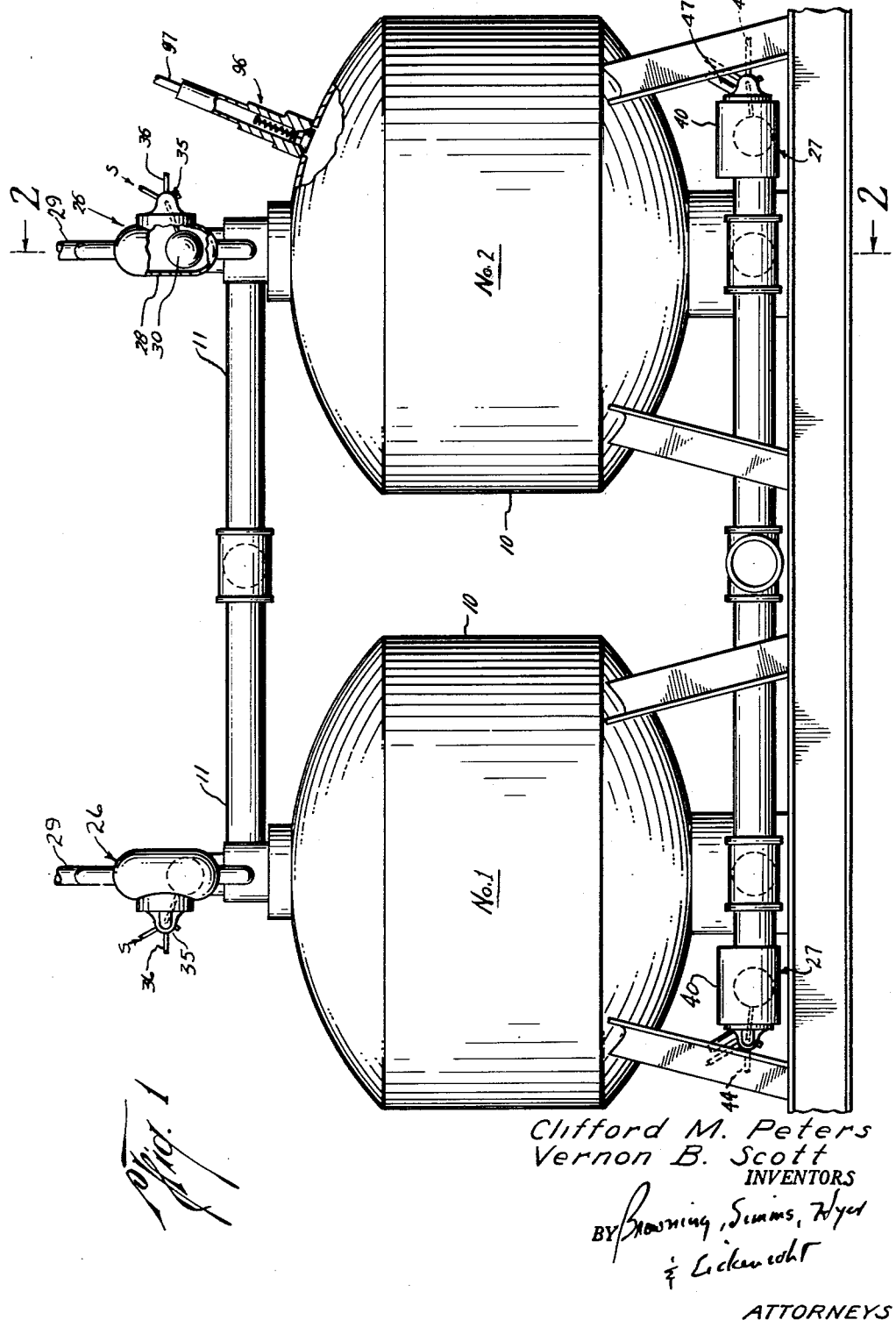
Clifford M. Peters
Vernon B. Scott
INVENTORS
BY Browning, Simms, Hyer
& Lieknecht
ATTORNEYS

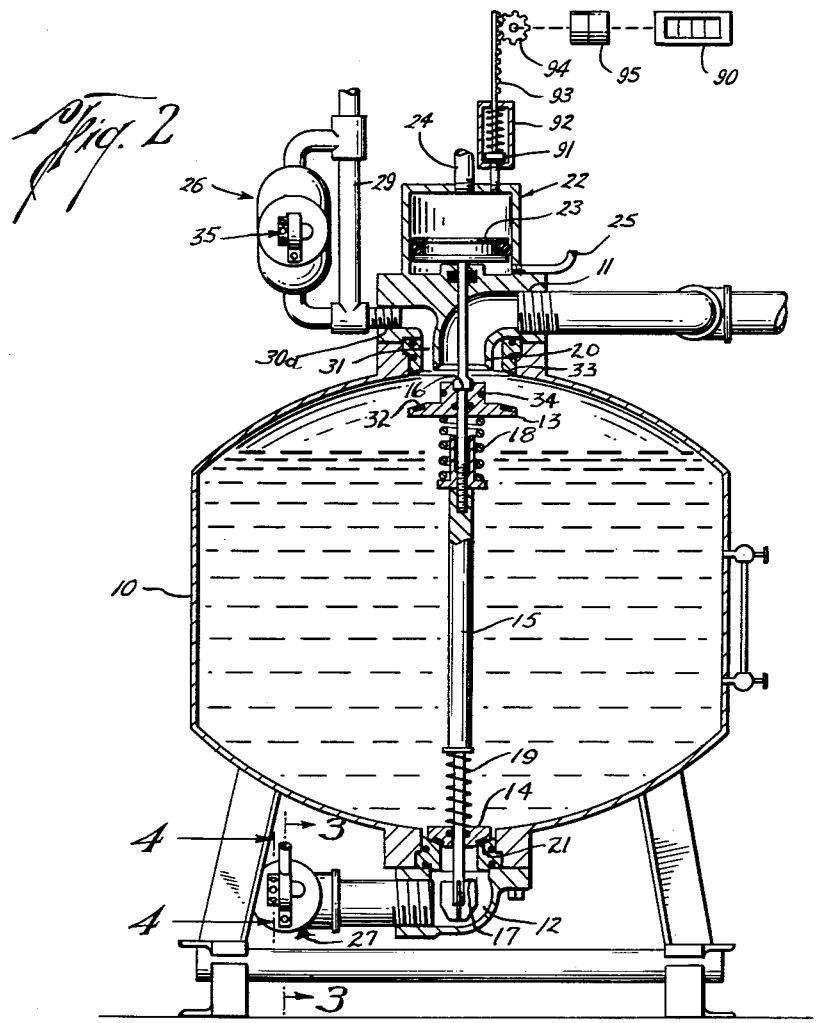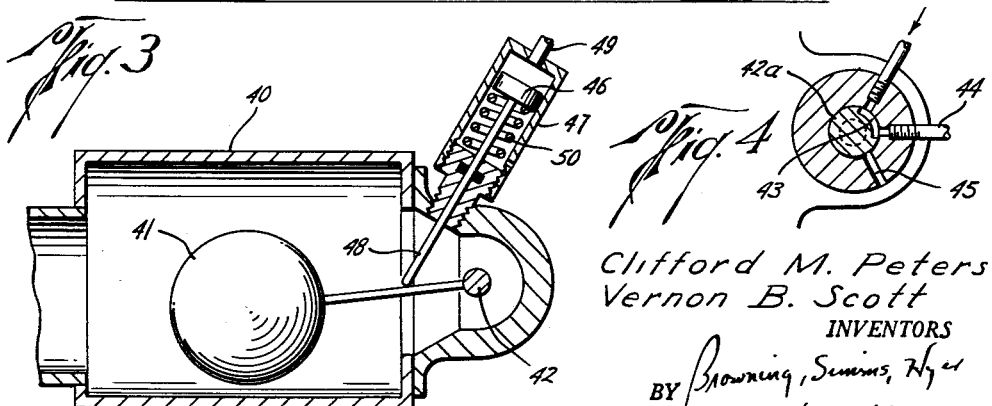

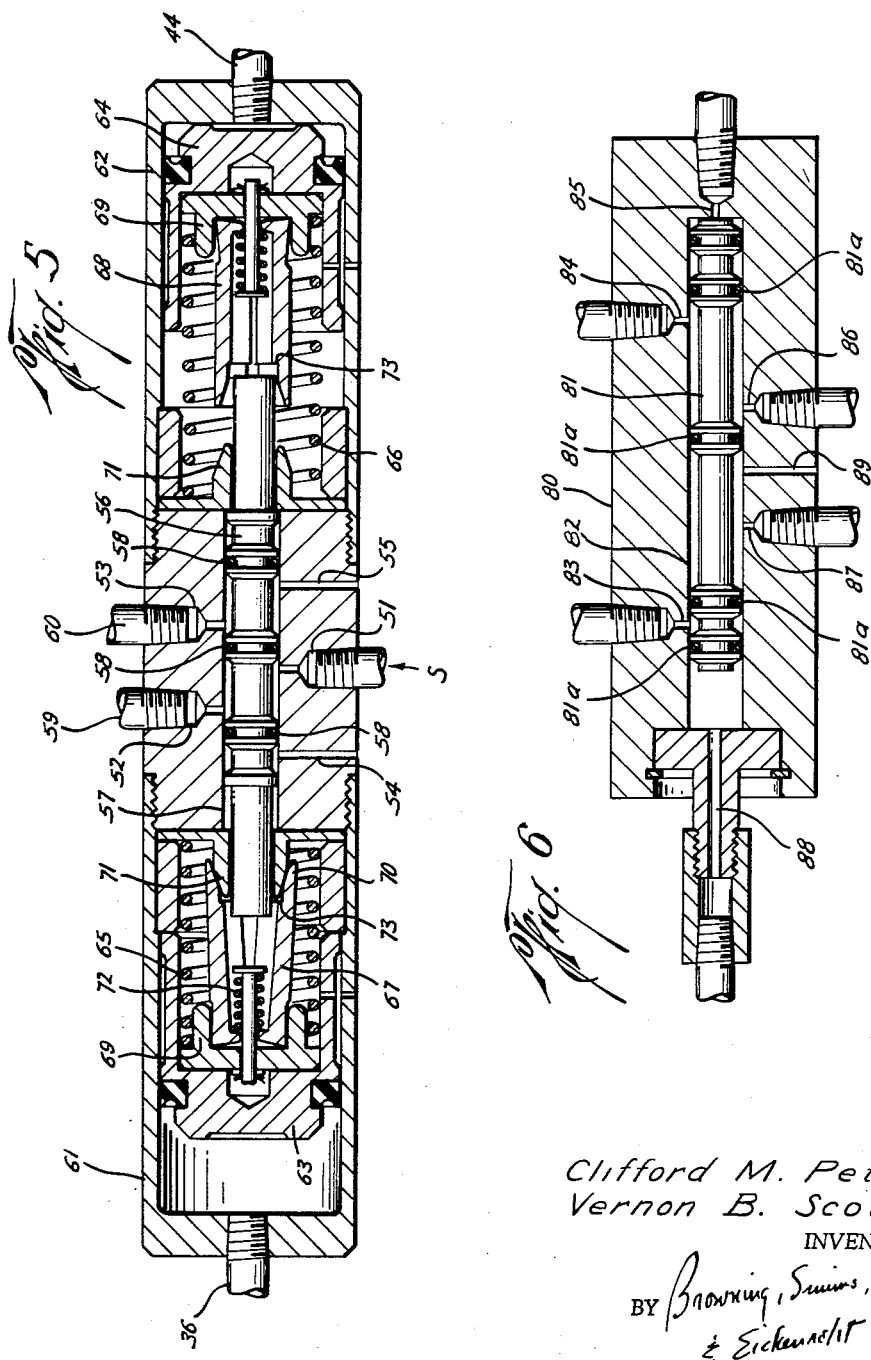

Clifford M. Peters
Vernon B. Scott
INVENTORS

ATTORNEYS

Nov. 28, 1961 V. B. SCOTT ET AL 3,010,317
AUTOMATIC CUSTODY TRANSFER METER
Filed Oct. 22, 1958 5 Sheets-Sheet 5

Clifford M. Peters
Vernon B. Scott
INVENTORS

BY Browning, Simmons, Hyer
& Eickenroht
ATTORNEYS

United States Patent Office 3,010,317
Patented Nov. 28, 1961

3,010,317
AUTOMATIC CUSTODY TRANSFER METER

Vernon B. Scott and Clifford M. Peters, Longview, Tex., assignors to U.S. Industries, Inc., a corporation of New York
Filed Oct. 22, 1958, Ser. No. 768,870
2 Claims. (Cl. 73—221)

This invention relates to a metering system wherein a plurality of automatic batching meters are arranged so that there is a substantially continuous liquid flow through the metering system.

It has been suggested in the past that a pair of batching meters be arranged in parallel so that one meter vessel could be filling while the other was emptying. One problem in such an arrangement is that of providing substantially continuous flow through the meter system and yet avoid serious metering errors. Thus it is entirely possible for one metering vessel to be filled more quickly than the other can empty. If the incoming liquid is switched from the filled vessel to the partially empty vessel so that flow can be continuous, then the volume metered would be in error by the amount of liquid remaining in the partially empty vessel. On the other hand, if the switching is made responsive to the emptying of one vessel, and such vessel should empty faster than the other one becomes filled, then the incoming liquid will again be switched too soon and there will be a volumetric error equal to the unfilled volume of the partially filled vessel.

Some types of batch meters, such as those shown in copending application Serial No. 634,016, filed January 14, 1957, are essentially self-controlled. Thus, the opening of the inlet valve to the metering vessel is made responsive to the vessel becoming empty and the opening of the outlet valve is made responsive to the vessel becoming filled. When two such meters are combined in a continuous parallel arrangement, it may readily happen that one meter will operate on a slightly faster cycle than the other one. Thus, even though the meters initially begin to operate 180° out of phase so as to achieve continuous flow, the meter with the shorter cycle will gradually creep up on the slower meter until the meters are operating in phase. Of course, this causes a discontinuous flow which is to be avoided.

One particular field of use for the meter system of this invention is in the automatic custody transfer of oil from a lease to a pipeline. For such use, the utmost accuracy is required because payment to the lease owner is based upon the volume of oil transferred. Due to the large volumes handled, an error of a very few percent can accumulate into thousands of dollars of over or under payment. Since the pipeline usually pays the lease owner based upon this volumetric measurement, it can be seen that both parties will insist upon an accurate measurement. Moreover, in many of these automatic custody transfer installations, large volumes of oil must be transferred and it is desired that the flow be as continuous as possible through the metering system in order to eliminate or substantially reduce the need for surge tanks. This is particularly true in the off-shore installations where the cost of installing large tanks is very great.

It is accordingly one object of this invention to provide a substantially continuous metering system employing meters of the batching type wherein the simultaneous filling and the simultaneous emptying of two or more metering vessels is prevented so that a substantially continuous flow can be achieved.

Another object of the invention is to provide a metering system wherein a pair of metering vessels are interlocked so that a filled vessel cannot begin emptying until the other vessel has been emptied and an empty vessel cannot begin filling until a filling vessel has been filled.

Another object of the invention is to provide a metering system including a pair of batching type metering vessels which are essentially self-controlled and yet which are interlocked so that both cannot simultaneously fill or simultaneously empty.

Other objects, advantages and features of the invention will be apparent to one skilled in the art upon a consideration of the specification, the claims and the drawings wherein:

FIG. 1 is generally an elevational view illustrating one embodiment of the apparatus of this invention;

FIG. 2 is an end view of the apparatus of FIG. 1 which has been partially sectioned to show internal construction;

FIG. 3 is a section taken on the line 3—3 of FIG. 2 illustrating the lower liquid level control and its holddown arrangement;

FIG. 4 is a section taken on line 4—4 of FIG. 2 showing the details of the three-way valves connected to the upper and lower floats of FIGS. 1 and 2;

FIG. 5 is a cross-sectional view illustrating one form of the shuttle valves used in conjunction with the metering vessels;

FIG. 6 is a cross-sectional view of an interlock valve connected between the vessels to integrate their operations;

Like characters of reference will be used throughout the several views to designate like parts.

General

Figure 7:
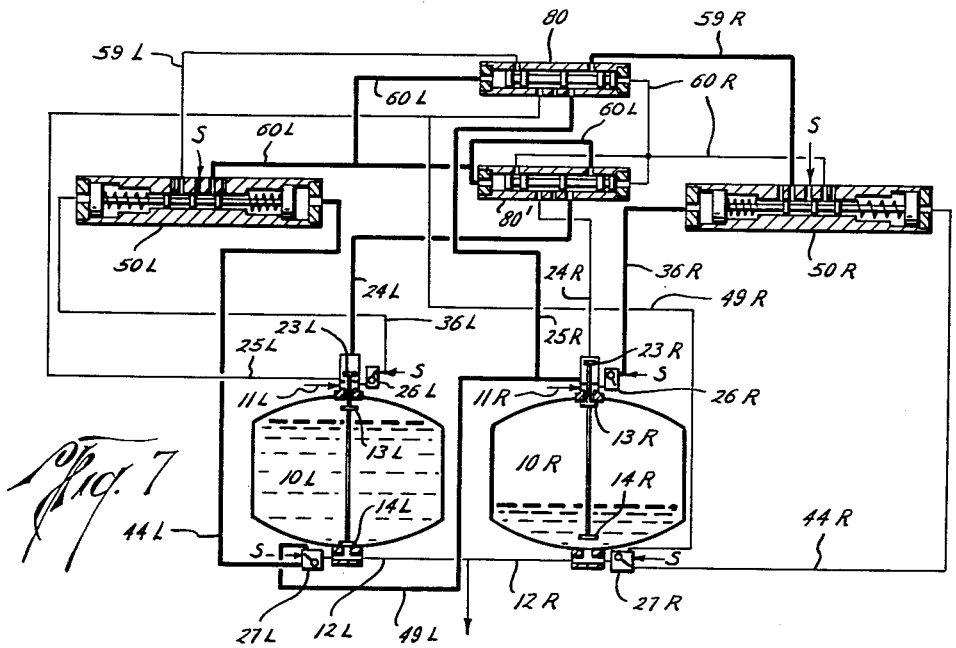
FIG. 7 is a rather diagrammatic illustration of the metering system wherein the lefthand tank is filling and the righthand tank is emptying.

Before turning to a detailed description of the components of the metering system and of the detailed operations thereof, a brief summary description of the entire system will be given. Referring to FIG. 7, a pair of batching meters are shown connected in parallel so that meter vessel 10L is filling while meter vessel 10R is emptying, and vice versa. Upon vessel 10L becoming full, a signal is sent to switch means 50L which is then positioned so that power can be applied to interrupt filling of vessel 10L and start emptying thereof. Should vessel 10R not yet have completed emptying, this power is blocked by interlock 80 until this interlock receives a signal that vessel 10R has emptied. At such time, the interlock is released so that power is applied to cause vessel 10L to begin emptying while vessel 10R is caused to begin filling. On the other hand, should vessel 10R become full before vessel 10L empties, the switch in power by switch 50R which would normally start vessel 10R to empty is again blocked by interlock 80 until vessel 10L completes its emptying. Conversely, should one vessel empty before the other becomes filled, the switch of power which would normally cause the empty vessel to begin filling is blocked by interlock 80' until the other vessel completes its filling. In this manner, liquid cannot simultaneously flow into both vessels and neither can it simultaneously flow therefrom. The vessels are kept substantially 180° out of phase with each other.

*System components*

In order to most clearly describe the metering systems illustrated in full in FIGS. 7–10, a somewhat detailed description of the components would seem to be first in order. It will be understood that while the illustrated components are now preferred, variations of these, as well as entirely dissimilar components, can be used to achieve the results of the invention.

Turning now to FIGS. 1 and 2, it will be seen the metering system is illustrated as comprising two batch meters No. 1 and No. 2. While these individual meters (as distinguished from the present system) and the individual controls associated with each meter (except the interlocks) are described in considerable detail in the above-identified copending application, to which reference is made, a rather brief description will be given here for the sake of completeness. Since the meters are illustrated as being of identical construction, it will be understood that this portion of the description applies to both meters. It will be noted that where it is desired to distinguish one meter from the other or one component of the meter from the other, the suffixes L and R have been added to the characters of reference.

Thus each meter comprises a vessel 10 having an inlet 11 and an outlet 12. Valve means are provided to control flow through these inlets and outlets including a valve operating means, the arrangement being such, preferably, that the outlet valve must close before the inlet valve can open and the inlet valve must close before the outlet valve can open. Thus in the illustrated arrangement, valve element 13 is provided to seat across inlet 11 and valve element 14 to seat across outlet 12. Each of the valve elements are slidingly mounted upon a valve rod 15 and are individually biased toward respective stops 16 and 17 on the rod by springs 18 and 19. The distance between stops 16 and 17 is made greater than the distance between valve seats 20 and 21 so that rod 15 has a lost motion connection with the valve elements. This permits the valve rod to seat one of the elements before opening the other. For example, upward movement of the rods as shown in FIG. 2 would first seat valve element 13 following which rod 15 would travel a short distance before stop 17 engages element 14 to unseat it. In the downward direction, the reverse action would take place. With this construction, liquid can never flow out of the vessel at the same time it is flowing into the same and the valve mechanism can be moved to a "neutral" position in which both valve elements are seated.

As indicated above, the valve means generally includes a valve operating means which is illustrated as comprising a cylinder 22 having a piston 23 disposed therein, the latter being connected to valve rod 15. It will thus be apparent that by applying pressure fluid to alternate sides of piston 23, via lines 24 and 25 (the word "line" being synonymous with pipe or tubing), the valve mechanism can be actuated as above described.

As part of the valve control means, means are provided which will normally actuate the valve operating means to close the upper valve and open the lower valve responsive to the vessel containing a predetermined maximum quantity of liquid as well as a means for closing the lower valve and opening the upper valve responsive to the vessel containing a predetermined minimum quantity (in this case zero) of liquid. In the illustrated arrangements, liquid sensing means in the form of float controls 26 and 27 are provided. The upper float control includes a float chamber 28 fluidly connected to a fluid standpipe 29 and containing a float 30. The standpipe is connected as by conduit 30a and annulus 31 to the top of vessel 10. Valve means are provided for closing this annulus from the vessel upon closing of the upper valve. In the illustrated arrangement, valve element 13 includes a seat 32 adapted to seat at 33 to close off the annulus. Preferably, seal 34 enters bore 20 prior to seating of 32 and 33. Thus it will be seen that with the upper valve open, and after the vessel becomes filled, liquid will back up into annulus 31 and standpipe 29 and also into the float chamber 28 to raise float 30. The raising of this float causes the emission of a signal to actuate the valve operating means to close the upper valve and, if the parallel vessel is in cycle, to open the lower valve. For example, raising of the float operates three-way valve 35 to cause pressure fluid to be applied from a source S to conduit 36 for further actuation of the control system so that eventually pressure is delivered to the underside of piston 23 to empty the vessel. Upon lowering of the float 30, the supply S is shut off and conduit 36 is vented to reduce the pressure therein. Details of this float control will become more apparent with the description of the lower float control which is similar.

Turning now to the lower float control, it will be seen that a float chamber 40 is provided in fluid communication with the outlet 12 from the metering vessel. As shown in FIG. 3, a float 41 is connected to a pivotal shaft 42 which in turn is connected to a pivotal valve element 42a (FIG. 4). The valve element has a cut-out section 43 which, when the float is in the down position, provides communication between source of pressure fluid S and conduit 44. However, upon raising the float, the source is shut off and conduit 44 is vented to a lower pressure via vent 45. Thus it will be seen that while the vessel is emptying, liquid will tend to fill float chamber 40 and raise float 41 so that the conduit 44 is vented. However, as soon as the vessel empties, the level in the chamber will fall and float 41 will connect the supply S with conduit 44 while shutting off vent 45.

For a purpose to be described later, it is sometimes desirable to hold float 41 in its lower position even though the chamber is filled with liquid. To do this, a piston 46 can be provided in a cylinder 47. The piston has a rod 48 which upon downward movement of the piston pushes the float 41 downwardly. This hold down arrangement is here shown as being fluid operated via a conduit 49 so that upon application of pressure, the float will be pushed downwardly. Return of the piston upon removal of pressure can be accomplished as by spring 50.

Turning now to FIG. 5, there is shown one form of a switch means for actuating the valve operator responsive to emptying and filling of a vessel. The illustrated switch is in the form of a valve and is termed a shuttle valve herein. It is essentially a three-way valve positionable to supply pressure to one side of piston 23 of the valve operator while venting the other side and vice versa. This application of pressure and venting is under the control of signals from the upper and lower float controls (via lines 36 and 44) and the arrangement is such that after a valve has been moved to one position by one signal, it can be moved to its other position by another signal even though the first signal is still being applied. Thus as shown in FIG. 5, the valve comprises generally a body having a supply port 51, ports 52 and 53, and vents 54 and 55. Flow through the various ports 52, 53 and vents 54, 55 is under control of a reciprocal valve element 56 sliding in bore 57 and having spaced seals 58 thereon. With the valve element positioned as shown, it will be seen that fluid from source S can flow through port 52 and out conduit 59. At the same time, port 53 and conduit 60 are vented via vent 55. On shifting of the valve element to the left, port 52 will be connected to vent 54 while supply S will be connected to port 53, vent 55 becoming sealed off from port 53.

One-way pressure responsive means are provided for shifting the valve element. Thus, at ends of the valve body these are provided with cylinders 61 and 62 containing pistons 63 and 64 which are biased to retracted positions by springs 65 and 66. Carried by the pistons are releasable latches 67 and 68. Each of these latches comprise a pair of hollow members adapted to be received in a socket 69 so as to be able to spread apart as shown in the lefthand portion of the view upon their cam surfaces 70 encountering a cam surface 71. Upon retraction of the piston, spring 72 moves the two halves of the latch members together as shown in the right hand end of the figure so that shoulders 73 thereon can abut the end of the valve element.

With this construction, it will be evident that upon application of pressure through conduit 44, piston 64 will move to the left with the latch shoulder 73 in engagement with the valve element. This moves the valve element so as to vent conduit 59 while pressurizing conduit 60. It will be seen the valve element can thus move to the left even though piston 63 is maintained under pressure and in advanced position as shown because the latch 67 is still in released position so that the valve element merely moves within the latch. As piston 64 moves to the left, the latch parts will engage cam surface 71 to be spread apart and thereby be released from the valve element. Upon retraction of the piston, the latch parts can move back together and all of this can be done without causing any movement of the valve element.

Thus, after the valve element has been moved in one direction by one of the piston-latch assemblies, it is still free to be moved in the opposite direction by the other piston even though the first piston has not had the signal removed therefrom to retract the same.

While the shuttle valve has been illustrated as having pistons at its ends, it will be appreciated that diaphragms or other pressure responsive elements can be substituted for these pistons. In such event, the valve would still employ the latches and these would be carried by the diaphragms.

Means are provided for interlocking the control systems of the individual batching meters in such a manner that one meter cannot begin filling until the other has completed filling and one cannot begin emptying until the other has completed emptying. In the particular illustrated embodiment, such means includes a pair of interlocking relays, here illustrated as valves. One such valve is shown in FIG. 6. It comprises a body 80 containing reciprocal valve element 81 within the bore 82, as well as fluid ports 83 through 88 and vent 89. The valve element has seals 81a appropriately spaced so that with the element positioned as shown, flow is blocked through port 83, port 87 is vented and ports 84 and 86 are interconnected. By movement of the valve element to the left, ports 83 and 87 will be interconnected, port 86 vented and flow through port 84 blocked.

To count the number of liquid batches and hence indicate the metered volume, a counter 90 (FIG. 2) can be provided. Suitable linkage is provided to cause a count each time a batch of liquid is measured. Thus piston 91 in cylinder 92 can be connected to a rack 93 which engages a pinion 94. An overrunning clutch 95 is connected between the pinion and counter. Thus, each time the valve operator receives either a fill (as shown) or an emptying signal, the rack is moved to turn the counter. Retraction of the rack does not cause a count because of the overrunning clutch.

Also, if desired, a pressurizing valve 96, comprising a spring loaded check valve, can be provided, to admit gas to the meter from line 97 to aid in emptying the meter.

*Operation*

With the details of the system components now fully understood, the detailed operation of the entire system will be more fully appreciated. The components are shown only schematically in FIGS. 7 to 10 but it will be apparent from the detailed description thereof as to their mode of operation.

The assembled metering system of FIG. 7 is shown with vessel 10L filling and vessel 10R emptying. The various lines containing signal pressure are shown as heavy lines while those which are vented are shown as light lines. Thus pressure fluid flows from the source S through shuttle valve 50L and line 60L to interlock pilot 80 where it holds the valve element in the right hand position. It likewise flows through line 60L to interlock pilot 80′ and thence via line 24L to the upper side of the piston 23L which is actuated to open upper valve 13L and close lower valve 14L. This permits vessel 10L to fill. At the same time, pressure fluid flows from another source S to shuttle valve 50R, line 59R, interlock pilot 80 and line 25R to the underside of the piston 23R. This causes upper valve 13R to be closed and lower valve 14R to be opened. It will also be seen that pressure fluid flows from line 25R via line 49L to the hold down piston for float control 27L. This causes line 44L to be pressurized but this pressure is not of any effect since the valve element of shuttle valve 50L has already been moved to the left by a signal from float control 27L occurring when vessel 10L emptied previously as will be more apparent below.

Figure 8:
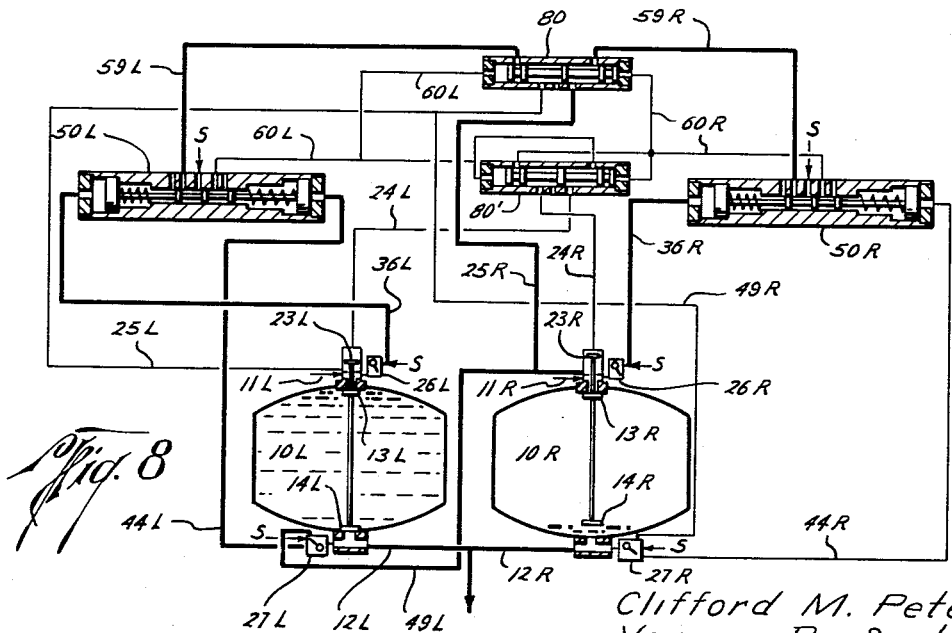
FIG. 8 is a view similar to FIG. 7 except it shows the position of the components of the system when the lefthand tank is full and the righthand tank is still emptying.
Figure 9:
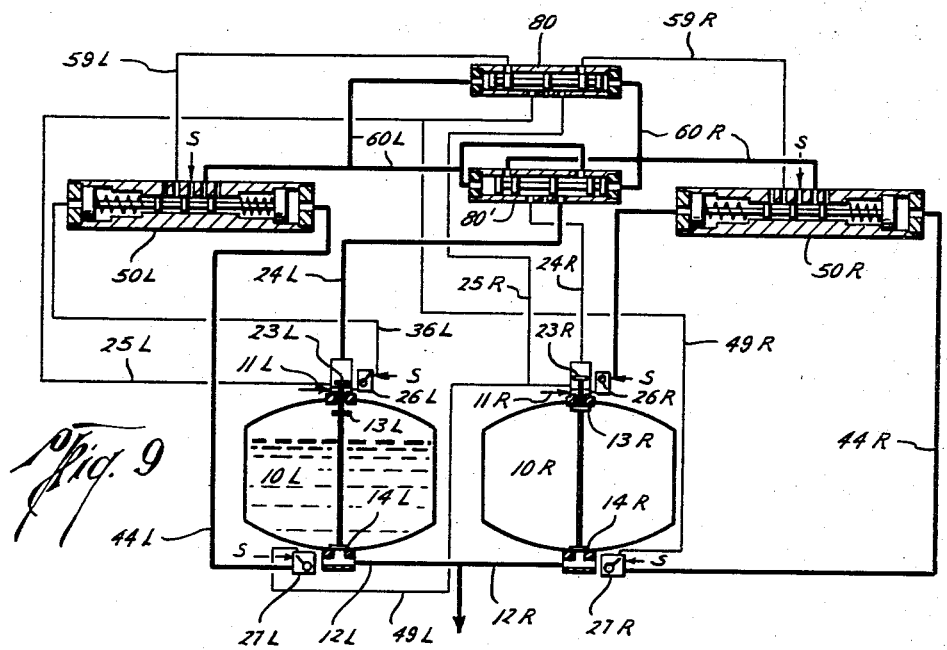
FIG. 9 is similarly a diagrammatic illustration showing the lefthand tank filling the righthand tank after it has emptied.

Now let it be assumed that vessel 10L becomes filled before vessel 10R empties as depicted in FIG. 8. On filling of vessel 10L, upper float control 26L pressurizes line 36L which causes the valve element in shuttle valve 50L to be shifted to the right. This vents the pressure previously applied to the top of the piston by virtue of venting line 60L which in turn vents line 24L. The valve mechanism of vessel 10L is thus positioned in neutral position with both valves closed. At the same time, line 59L is pressurized from source S. However, this pressure in line 59L is blocked at interlock pilot 80 since the valve elements of interlocks 80 and 80′ will not be shifted at this time due to no pressure being applied by shuttle valve 50R to lines 60R. Thus even though line 59L is pressurized by shuttle valve 50L, flow to line 25L and hence to the underside of the piston is blocked by interlock relay 80. As stated, this means that the valve mechanism of vessel 10L assumes the neutral position with both the upper and lower valves closed.

Figure 10:
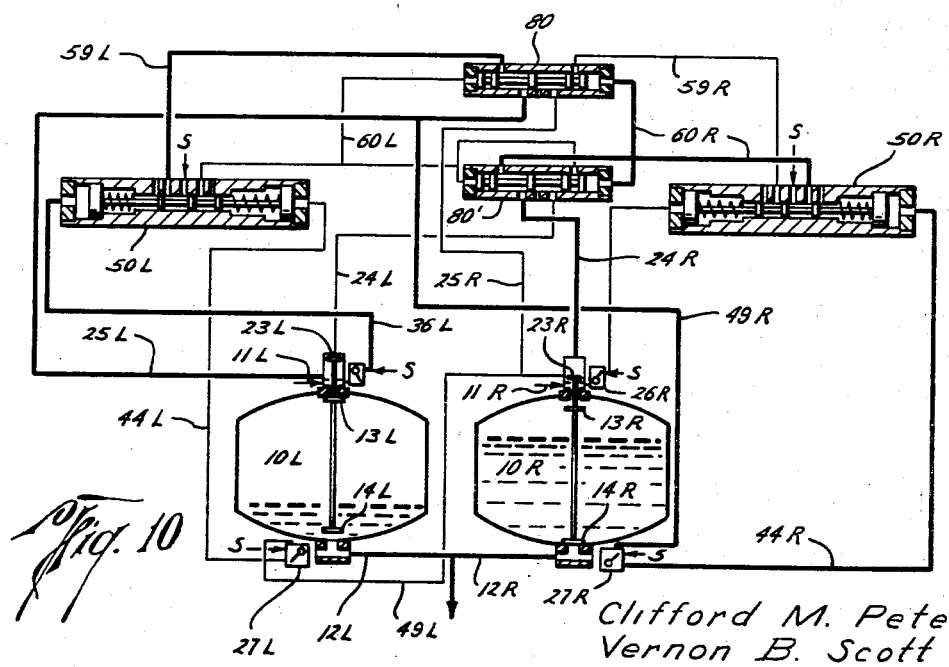
FIG. 10 is another diagrammatic illustration showing the lefthand tank emptying and the righthand tank filling.

As soon as vessel 10R empties, its lower float control will pressurize line 44R which causes the valve element of shuttle valve 50R to shift to the left as shown in FIG. 10. This shifting causes line 60R to be pressurized from source S which pressure is applied against the right ends of the valve elements of interlock relays 80 and 80′ to cause them to shift to the left. As the valve element of interlock relay 80 so shifts, the previously pressurized line 59L is connected to line 25L so that pressure is applied to the lower side of piston 23L to open the lower valve of vessel 10L. At the same time, the shifting of the valve element of interlock relay 80′ connects the pressurized line 60R to line 24R so that the lower valve of vessel 10R is closed and the upper valve opened. It will also be seen that branch 49R is pressurized to hold the float of level control 27R in its down position. The system will then be as shown in FIG. 10.

Let it be assumed that vessel 10L becomes filled before vessel 10R is emptied. This condition is reflected in FIG. 8. As soon as vessel 10L is full, its upper float control 26L pressurizes line 36L which causes the valve element of shuttle valve 50L to be shifted to the right. As above described, the shuttle valve can be so shifted even though lower float control 27L is still applying a signal to the shuttle valve and is holding piston 64 (FIG. 5) in advanced position. The shuttle valve now permits line 59L to be pressurized but the application of such pressure to the underside of piston 23L to open the lower valve of vessel 10L is prevented by interlock pilot 80. This pilot cannot shift, even though line 60L is now vented, because line 60R is likewise vented. Therefore, vessel 10L cannot begin emptying until vessel 10R is emptied and until the latter event happens, the valve mechanism of vessel 10L is in neutral position with both valves closed. However, when vessel 10R does become empty, float control 27R pressurizes line 44R which shifts the valve element of shuttle valve 50R to the left. This pressurizes line 60R which shifts the valve element of interlock relay 80 to the left thereby opening line 25L to be pressurized from line 59L. Hence, vessel 10L begins to empty. At the same time, line 24R is pressurized via interlocking relay 80' and vessel 10R begins to fill.

Let it be assumed that vessel 10R has emptied before vessel 10L has become full. Such a condition is reflected in FIG. 9. Thus upon emptying of vessel 10R, its lower float control pressurizes line 44R which shifts the valve element of shuttle valve 50R to the left. This pressurizes line 60R and this would normally cause the valve elements of both interlocking relays 80 and 80' to be shifted to the left. However, since tank 10L is not yet filled, line 60L will still be pressurized and this pressure applied to the left hand ends of the valve elements of interlocking relays 80 and 80' balances the effect of pressure on the other end so that the valve elements do not move. In this connection, it will be noted that there will be sufficient frictional resistance to the movement of these valve elements to nullify any slight discrepancy in pressures applied against the opposite ends.

Hence even though line 60R is pressurized, the application of pressure to line 24R to open the upper valve of vessel 10R is prevented by interlock relay 80'. As soon as vessel 10L fills, however, its upper level control pressurizes line 36L causing the valve element of shuttle pilot 50L to move to the right. This vents line 60L whereupon interlocking relays 80 and 80' have their valve elements moved to the left. Such movement results in the opening of the upper valve of vessel 10R and the opening of the bottom valve of vessel 10L.

It will be seen that the use of the hold-downs for the lower float controls, that is, a means for preventing the lower level sensing devices from sending a signal to switch means 50 so as to cause the same to be switched at the wrong time, prevent shifting of the valve elements of the shuttle valves 50L and 50R to the left at times other than those at which a vessel finishes emptying. Thus, due to the interconnection of the vessel outlets, liquid may back up into both float control chambers. Without the hold-downs, it would be possible for the lower floats to send a signal each time each vessel empties. For example, should vessel 10L fill before vessel 10R completes emptying, level control 26L would cause the valve element of shuttle valve 50L to shift to the left. At this time, there would be no pressure in line 44L since level control 27L would have its float in the up position due to backflow of liquid from emptying vessel 10R. Then upon vessel 10R becoming empty, both lower floats would fall and this would cause the valve element of shuttle valve 50L to be shifted to the left prematurely.

While the description above of the operation of the metering system has been with respect to vessel 10L filling before vessel 10R is empty, etc., it will be appreciated that the same mode of operation will result if the situation is reversed, e.g. vessel 10R becoming full before vessel 10L is empty, etc. In other words, the system is balanced from an operational viewpoint.

While a pneumatic control system has been described in detail, it is contemplated that equivalent electrical components can be substituted, in whole or in part, for the pneumatic components.

From the foregoing it will be seen that this invention is one well adapted to attain all of the ends and objects hereinabove set forth, together with other advantages which are obvious and which are inherent to the apparatus and system.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A continuous batching meter comprising a plurality of vessels, valve means controlling flow into and out of the vessels; three position power driven means connecting the valve means to open the inlet and close the outlet of the vessel upon application of power in one directional sense and to close the inlet and open the outlet upon application of power in another directional sense and to close both the inlet and outlet upon removal of power; switching relays connected to the power driven means to switch power applied thereto between said directional senses; means sensitive to liquid level connected to each vessel and to the respective ones of said switching relays to cause the latter to switch power to its respective valve means responsive to the liquid level in its respective vessel reaching predetermined high and low levels; fill and empty interlocking relays each in series with said switching relays and each being movable between a plurality of positions, in a first position preventing power from flowing from one switching relay to its motor means while permitting flow of power from another switching relay to its motor means and in a second position preventing power to flow from said another switching relay to its motor means while permitting power to flow from said one switching relay to its motor means; means interconnecting said one switching relay and each of said fill and empty relays urging them to their second and first positions respectively when said one switching relay is positioned to apply power to its motor means; and means interconnecting said another switching relay and each of said fill and empty relays urging them to first and second positions respectively when said another switching relay is positioned to apply power to its motor means.

2. A continuous batching meter comprising a pair of vessels; valve means controlling flow into and out of each of said vessels; valve operating means including a pressure responsive member connected to the valve means to open the inlet and close the outlet of the vessel upon applying pressure to one side of the pressure responsive means and to open the outlet and close the inlet upon applying pressure to the other side of the pressure responsive means and to close both the inlet and outlet upon equalization of pressure on both sides of the pressure responsive means; a pressure actuated switching pilot valve connected to each valve operating means and movable between first and second positions to alternately apply pressure to opposite sides of said pressure responsive means; means sensitive to liquid level in said vessels and applying pressure to the respective ones of said pilot valves to urge them to their first position upon liquid in their respective vessels reaching a predetermined low level and to urge them to their second positions upon said liquid reaching a predetermined high level; fill and empty relay valves connected in series with each of said pilot valves and its respective valve operating means and each being movable between a first position in which it prevents application of pressure to one valve operating means while permitting application to the other and a second position in which it permits application of pressure to said one valve operating means while preventing application to the other; means for so moving the fill and empty relays responsive to the liquid levels in both vessels respectively reaching said high and low levels; and vent means for venting one side of the pressure responsive means while said pilot valves are positioned to apply pressure to the other side.

References Cited in the file of this patent

UNITED STATES PATENTS

| | | |
|---|---|---|
| 2,079,027 | Myon | May 4, 1937 |
| 2,282,497 | Schultz | May 12, 1942 |
| 2,872,817 | Pitts | Feb. 10, 1959 |

FOREIGN PATENTS

| | | |
|---|---|---|
| 558,597 | Germany | Sept. 9, 1932 |
| 765,258 | France | Mar. 19, 1934 |